United States Patent
Nonin et al.

(10) Patent No.: US 7,751,824 B2
(45) Date of Patent: Jul. 6, 2010

(54) RADIO COMMUNICATION SYSTEM AND BASE STATION THEREOF

(75) Inventors: Katsuya Nonin, Kawasaki (JP); Tomoko Adachi, Urayasu (JP); Toshihisa Nabetani, Kawasaki (JP); Tomoya Tandai, Tokyo (JP); Satoshi Kaburaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 58 days.

(21) Appl. No.: 11/070,646

(22) Filed: Mar. 3, 2005

(65) Prior Publication Data
US 2005/0227698 A1 Oct. 13, 2005

(30) Foreign Application Priority Data
Mar. 25, 2004 (JP) .............................. 2004-089226

(51) Int. Cl.
H04W 72/00 (2009.01)
H04W 4/00 (2009.01)
H04B 7/212 (2006.01)

(52) U.S. Cl. .................... 455/452.2; 455/453; 370/348; 370/329

(58) Field of Classification Search .............. 455/452.2, 455/561, 453; 370/329, 332, 348
See application file for complete search history.

(56) References Cited

U.S. PATENT DOCUMENTS

| | | | |
|---|---|---|---|
| 5,062,104 A * | 10/1991 | Lubarsky et al. | 370/466 |
| 5,742,602 A * | 4/1998 | Bennett | 370/401 |
| 5,953,340 A * | 9/1999 | Scott et al. | 370/401 |
| 6,798,736 B1 * | 9/2004 | Black et al. | 370/208 |
| 7,106,705 B1 * | 9/2006 | Mecklenbrauker et al. | 370/329 |
| 2003/0081627 A1 * | 5/2003 | Bao et al. | 370/444 |
| 2003/0198204 A1 * | 10/2003 | Taneja et al. | 370/332 |

(Continued)

FOREIGN PATENT DOCUMENTS

AO 2002-78012 3/2002

OTHER PUBLICATIONS

"Draft Supplement to Standard for Telecommunications and Information Exchange Between Systems-LAN/MAN Specific Requirements- Part 11: Wireless Medium Access Control (MAC) and Physical Layer (PHY) specifications: Medium Access Control (MAC) Enhancements for Quality of Service (QoS)", IEEE Std 802.11e/D4.3 (Draft Supplement to IEEE Std 802.11, 1999 Edition), May 2003, 179 pages.

*Primary Examiner*—George Eng
*Assistant Examiner*—Christopher M Brandt
(74) *Attorney, Agent, or Firm*—Oblon, Spivak, McClelland, Maier & Neustadt, L.L.P.

(57) ABSTRACT

A radio communication system in which a plurality of wireless terminals form wireless channels separately between a common base station unit and wireless terminals and communicate with the base station unit, the radio communications system comprises quality managing section manages communication quality of wireless channel for each of wireless terminals by assigning occupied band of wireless channel on basis of a predetermined parameter, channel securing section secures continuously wireless channel for at least one wireless terminal by controlling data rate of the wireless channel according to change in channel state between wireless sections, and rate change detecting section supplies trigger information to quality managing section when data rate of at least one wireless channel changes as a result of control performed by channel securing section, the quality managing section, when being given trigger, updating occupied band assigned state of the wireless channel for each of wireless terminals.

18 Claims, 8 Drawing Sheets

U.S. PATENT DOCUMENTS

2004/0106434 A1* 6/2004 Shibasaki .................... 455/561
2004/0203834 A1* 10/2004 Mahany ....................... 455/453
2004/0253940 A1* 12/2004 Andrews et al. ............ 455/405
2005/0059417 A1* 3/2005 Zhang et al. ................. 455/515
2005/0113106 A1* 5/2005 Duan et al. ............... 455/452.2
2005/0159166 A1* 7/2005 Jonsson et al. ........... 455/452.2

* cited by examiner

| Data rate (Mbits / s) | Modulation | Coding rate(R) | Coded bits per subcarrier ($N_{BPSC}$) | Coded bits per OFDM symbol ($N_{CBPS}$) | Coded bits per OFDM symbol ($N_{DBPS}$) |
|---|---|---|---|---|---|
| 6 | BPSK | 1/2 | 1 | 48 | 24 |
| 9 | BPSK | 3/4 | 1 | 48 | 36 |
| 12 | QPSK | 1/2 | 2 | 96 | 48 |
| 18 | QPSK | 3/4 | 2 | 96 | 72 |
| 24 | 16-QAM | 1/2 | 4 | 192 | 96 |
| 36 | 16-QAM | 3/4 | 4 | 192 | 144 |
| 48 | 64-QAM | 2/3 | 6 | 288 | 192 |
| 54 | 64-QAM | 3/4 | 6 | 288 | 216 |

Link adaptation management table 112a

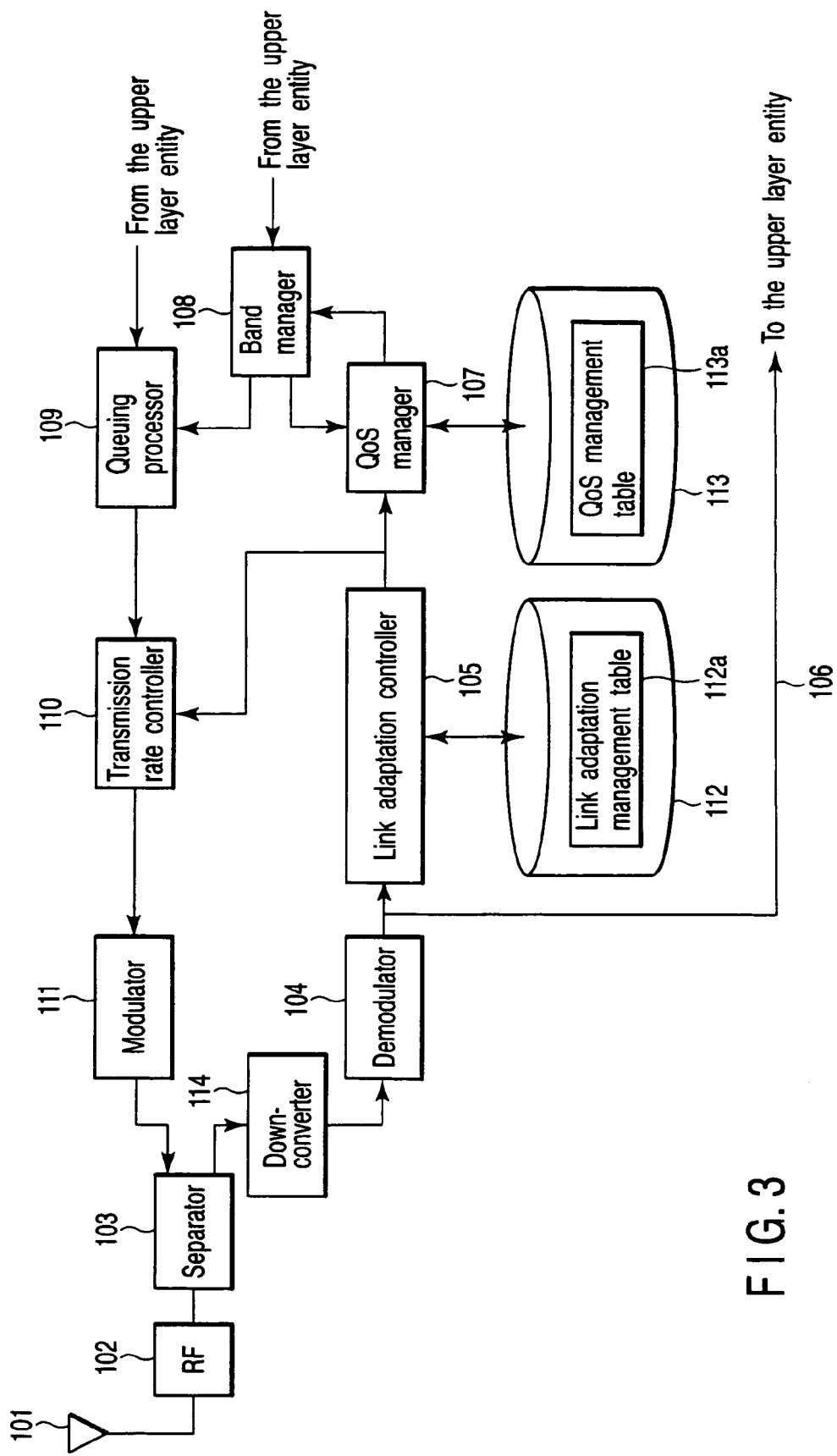
F I G. 3

| Terminal 1 | Data 1 | User priority |
| | | Minimum service interval |
| | | Inactivity interval |
| | | Minimum data rate |
| | | Delay bound |
| | Data 2 | User priority |
| | | Minimum service interval |
| | | Inactivity interval |
| | | Minimum data rate |
| | | Delay bound |
| Terminal 2 | Data 1 | User priority |
| | | Minimum service interval |
| | | Inactivity interval |
| | | Minimum data rate |
| | | Delay bound |
| | Data 2 | User priority |
| | | Minimum service interval |
| | | Inactivity interval |
| | | Minimum data rate |
| | | Delay bound |
| ⋮ | ⋮ | ⋮ |

QoS management table 113a

FIG. 5

RADIO COMMUNICATION SYSTEM AND BASE STATION THEREOF

CROSS-REFERENCE TO RELATED APPLICATIONS

This application is based upon and claims the benefit of priority from prior Japanese Patent Application No. 2004-089226, filed Mar. 25, 2004, the entire contents of which are incorporated herein by reference.

BACKGROUND OF THE INVENTION

1. Field of the Invention

This invention relates to the radio communication field. More particularly, this invention relates to a system which performs QoS control by varying the slot length in a system where a plurality of wireless terminals communicate with a common base station by Time Slot Sharing (TSS). One system of this type is a wireless local area network (LAN). This invention can be applied suitably to such a radio communication system.

2. Description of the Related Art

In recent years, the techniques for wireless LAN systems complying with the IEEE standard 802.11 series have been developed actively. The standard covers the technique for maintaining the channel while varying the communication quality, by changing the data rate and modulation method according to the situation of the wireless link. This type of technique is known as multi-rate control or link adaptation. Recently, the combination of these and the concept of (quality of service (QOS) has been studied (refer to IEEE Std 802.11e/D4.3, May 2003 Draft Supplement to standard for Telecommunications and Information Exchange Between System—LAN/MAN Specific Requirements—Part 11: Wireless Medium Access Control [MAC] and Physical Layer [PHY] specifications: Medium Access Control [MAC] Enhancements for Quality of Service [QoS]).

Another technique for combining link adaptation with QoS in allocating wireless resources to terminals has been disclosed (for example, refer to Jpn. Pat. Appln. KOKAI Publication 2002-78012). In this document, however, no consideration has been given to a case where QoS is not satisfied since the communication quality has degraded due to link adaptation after the setting of the channel. Moreover, in this document, the index of measuring QoS is only the priority of transmission data.

The IEEE standard 802.11e/D4.3 has prescribed that the QoS of communication data (traffic) should be evaluated on the basis of not only the priority of transmission data but also such parameters as the minimum data rate, the maximum delay bound, and the inactivity interval in a wireless LAN. Therefore, to combine link adaptation with QoS in a radio communication system complying with the standard, the wireless band has to be managed, taking into account temporal changes in the communication quality and various parameters of QoS.

As described above, in the link adaptation techniques, there is a possibility that the communication quality will vary during communication. Since in the existing ratio communication systems, these things have not been taken into account, the communication quality can deteriorate due to adaptation during communication, possibly preventing QoS from being met. In addition, although a plurality of parameters have to be evaluated comprehensively in measuring QoS, there has been no system which has taken this into account.

BRIEF SUMMARY OF THE INVENTION

According to an aspect of the present invention, there is provided a radio communication system in which a plurality of wireless terminals form wireless channels separately between a common base station unit and the wireless terminals and communicate with the base station unit, the radio communications system comprises a quality managing section which manages the communication quality of the wireless channel for each of the plurality of wireless terminals by assigning the occupied band of the wireless channel for each of the plurality of wireless terminals to each of the plurality of wireless terminals on the basis of a predetermined parameter, a channel securing section which secures continuously a wireless channel for at least one wireless terminal by controlling the data rate of the wireless channel for each of the plurality of wireless terminals according to a change in the channel state between wireless sections, and a rate change detecting section which supplies trigger information to the quality managing section when the data rate of at least one wireless channel changes as a result of control performed by the channel securing section, the quality managing section, when being given the trigger information, updating the occupied band assigned state of the wireless channel for each of the plurality of wireless terminals.

BRIEF DESCRIPTION OF THE SEVERAL VIEWS OF THE DRAWING

FIG. 1 is a system diagram showing an embodiment of a radio communication system according to the present invention.

FIG. 3 is a functional block diagram of an embodiment of the base station 100 of FIG. 1.

FIG. 4 shows an example of the link adaptation management table 112a.

FIG. 5 shows an example of the QoS management table 113a.

DETAILED DESCRIPTION OF THE INVENTION

Figures 1, 4:
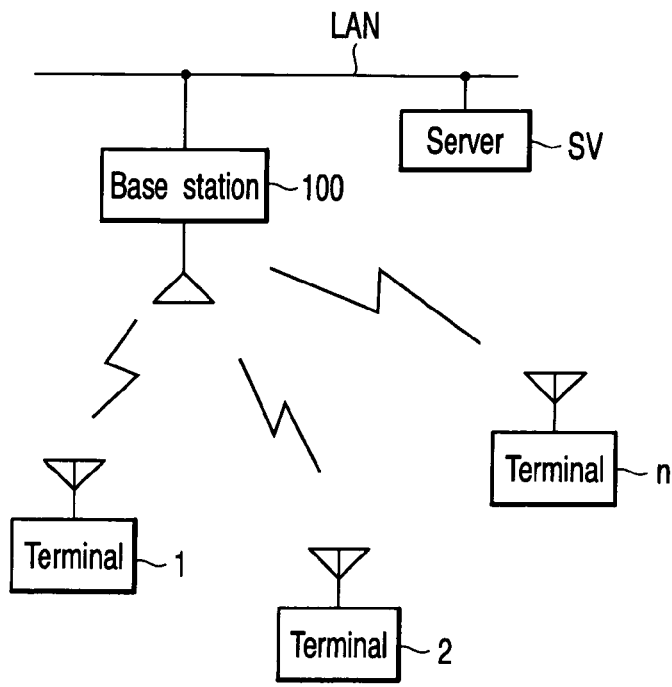

FIG. 1 is a system diagram showing an embodiment of a radio communication system according to the present invention. This system comprises a server SV, a base station 100, and wireless terminals (hereinafter, referred to as terminals) 1 to n. The server SV and base station 100 are connected toga wired network (local area network (LAN)). Terminals 1 to n are connected to the base station 100 via wireless channels. Each of the terminals 1 to n acquires data, such as video data or WWW (world wide web) data from the server SV via the base station 100.

The terminals 1 to n transmit and receive data to and from one another via the base station 100. This communication mode is called the infrastructure mode. The communication mode which allows the terminals 1 to n to exchange data directly with one another without the intervention of the base station 100 is called the ad hock mode.

Figure 2:
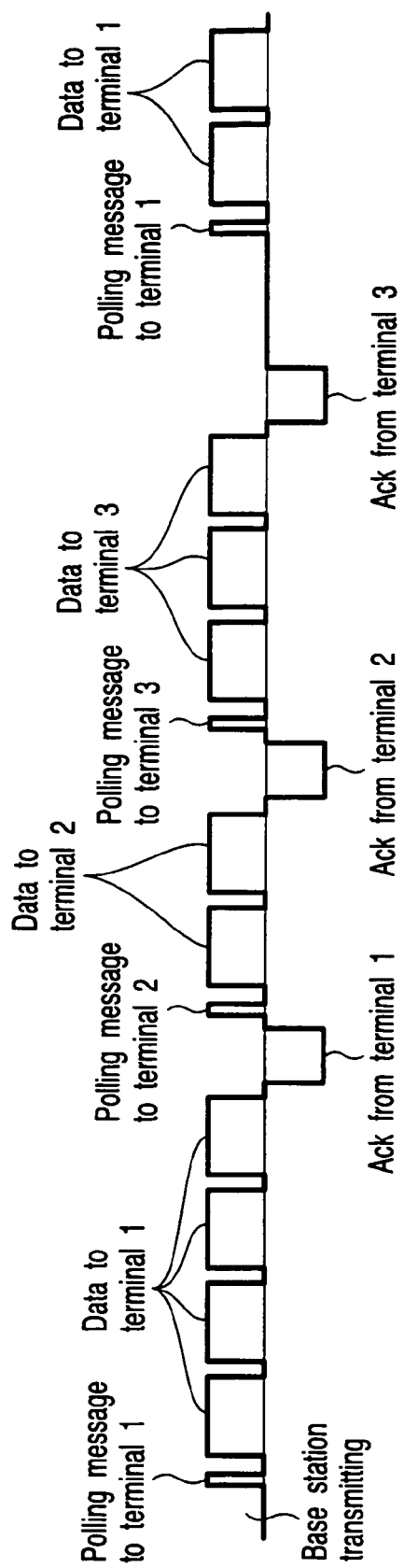
FIG. 2 is a diagram showing an example of the procedure for data transmission and reception between the base station 100 and terminals 1 to n in the system of FIG. 1.

FIG. 2 is a diagram showing an example of the procedure for data transmission and reception between the base station 100 and terminals 1 to n in the system of FIG. 1. In FIG. 2, the number of terminals is assumed to be 3 (n=3). In FIG. 2, the base station 100 transmits a polling message addressed to terminal 1 and then burst-transmits the data addressed to terminal 1 in frames, and receives a communication complete message (Ack) from terminal 1. Next, the base station 100 transmits a polling message addressed to terminal 2 and then burst-transmits the data addressed to terminal 2 in frames, and receives a communication complete message (Ack) from terminal 2. Next, the base station 100 transmits a polling message addressed to terminal 3 and then burst-transmits the data addressed to terminal 3 in frames, and receives a communication complete message (Ack) from terminal 3.

The above sequence is carried out periodically. Specifically, when the data transmission to terminal 3 has ended, data transmission to terminal 1 is started again. The burst transmission period for each terminal is calculated in advance on the basis of the QoS parameter of the data transmitted to each terminal from the base station 100. The period of burst transmission is also calculated on the basis of the parameters of QoS. The data rate of the wireless channel between the base station 100 and the respective terminals 1 to 3 is controlled variably according to the state of the wireless channel.

FIG. 3 is a functional block diagram of an embodiment of the base station 100 of FIG. 1. In FIG. 3, a radio frequency (RF) signal transmitted from each terminal is picked up by an antenna 101. The picked-up signal is amplified by an RF section 102. The amplified signal is then sent via a separator 103 to a down-converter 114. The down-converter 114 converts the frequency of the RF signal to base-band and then a base-band signal is created. The base-band signal is then sent to a demodulator 104. The demodulator 104 receives and demodulates the base-band signal and supplies the received data to a link adaptation controller 105. The received data is also output to a media access control (MAC) processor (not shown) and the like for use in the processes at upper layer levels.

The link adaptation controller 105 determines the radio transmission quality of the received data. The link adaptation controller 105 also determines the data rate of the received data on the basis of the contents of a link adaptation management table 112a stored in a memory 112. When the data rate is changed as a result of link adaptation during communication, this is notified to a QoS manager 107 and a transmission rate controller 110.

Being notified of the change of the data rate, the QoS manager 107 is triggered by the notice and examines the QoS of the data whose data rate has changed. At that time, the QoS manager 107 refers to the contents of a QoS management table 113a stored in a memory 113. Then, the QoS manager 107 recalculates the necessary band to maintain QoS set in the data and informs a band manager 108 of the result.

The band manager 108 refers to the bands of all of the data items now in communication and their QoS parameters and reallocates bands to all of the data items. This makes the bands of at least part of or all of the transmission data be updated. Even when a new transmission data is requested by an upper layer, the band manager 108 recalculates radio bands for all of the data items, taking into account QoS of the requested transmission data and assigns a radio band to each of the data items. Information about the radio band reassigned is notified to a queuing processor 109, which uses the information to manage radio bands.

FIG. 4 shows an example of the link adaptation management table 112a. This table has been disclosed in the IEEE standard 802.11 series recommendation. This table causes data rate to correspond to modulation and coding rate in table form. The table is used to change data rates according to link adaptation. Referring to the table, the base station 100 and terminals 1 to 3 select a data rate currently best suited to the state of the wireless channel. The better the state of the wireless channel becomes, the larger the value of the data rate can be made. In the opposite case, the data rate is decreased by changing the modulation method to a less multiplexed one or decreasing the coding rate.

FIG. 5 shows an example of the QoS management table 113a. This table causes types of data to correspond to the individual terminals. In each data type, for example, five items, including user priority, minimum service interval, inactivity interval, minimum data rate, and delay bound, are set. In each item, a QoS parameter is set in values. For example, if audio data is used as data 1 and e-mail data is used as data 2, the user priority of data 1 is set higher than that of data 2. The allowed value of the delay bound of data 1 is set shorter than that of data 2. Referring to this table, the QoS manager 107 performs QoS management. The operation of this configuration will be explained below.

Figure 6:
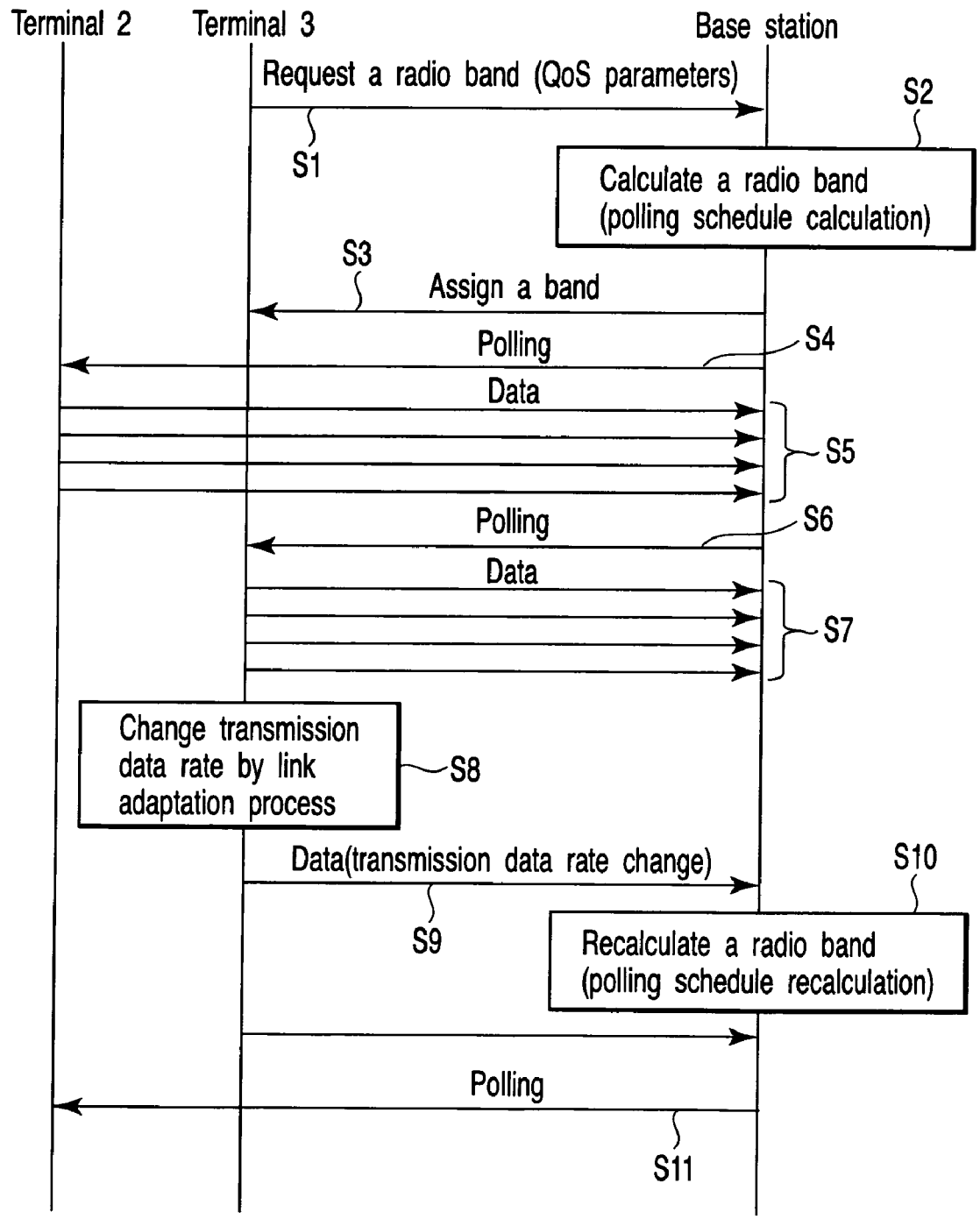
FIG. 6 is a sequence diagram showing the flow of messages between the base station and terminals 1 to 3 in FIG. 3.

FIG. 6 is a sequence diagram showing the flow of messages between the base station and terminals 1 to 3 in FIG. 3. In FIG. 6, terminals 2, 3 and the base station 100 will be mainly explained. In FIG. 6, suppose terminal 2 and the base station 100 are communicating with each other. In this state, when a request to communicate with the base station 100 is made at terminal 3, terminal 3 requests the base station 100 to assign a radio band (step S1). At that time, terminal 3 transmits to the base station 100 a QoS parameter according to the QoS of the data to be transmitted.

Receiving the radio band request, the base station 100 calculates whether a band can be assigned to terminal 3 (step S2). That is, the base station 100 calculates a polling schedule for terminal 3 on the basis of the bands occupied by the terminals currently in communication and the band requested by terminal 3. If the result of the calculation has shown that a band can be assigned to terminal 3, the base station 100 informs terminal 3 of the result of the calculation via a band assign message (step S3).

Next, the base station 100 polls terminal 2 now in communication (step S4). In response to this, terminal 2 transmits data to the base station 100 (step S5). Thereafter, the base station 100 polls terminal 3 to which a band has been newly assigned (step S6). In response to this, terminal 3 transmits data to the base station 100 (step S7).

When the communication between terminals 2, 3 and the base station 100 is continued in this procedure, if the state of the wireless channel changes, a link adaptation process is carried out, thereby changing the transmission data rate for each terminal (step S8). When having detected from the transmission data sent from, for example, terminal 3 that the data rate has been changed (step S9), the base station 100 is triggered by this and recalculates radio bands to be assigned to the individual terminals (step S10). That is, receiving the notice of the change of the data rate, the base station 100 recalculates the polling schedule for the individual terminals and thereafter effects polling according to the recalculated schedule (step S11). Next, referring to FIG. 7, a method of detecting the data rate will be explained in detail.

Figure 7:
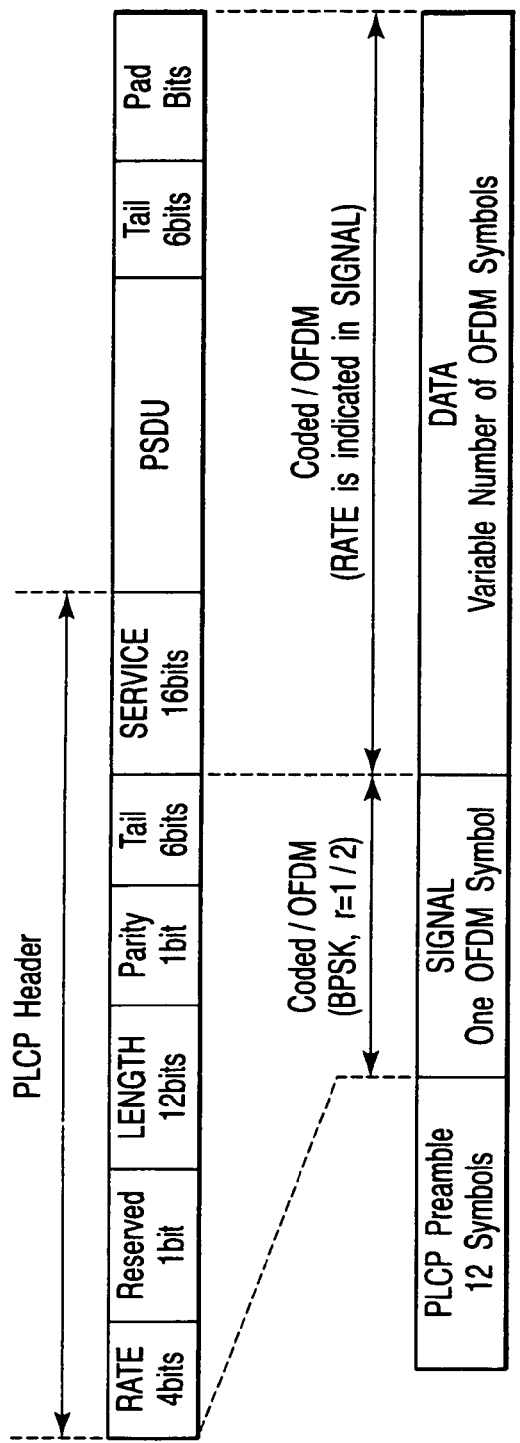
FIG. 7 shows an example of a data frame exchanged between the base station 100 and the terminals 1 to 3.

FIG. 7 shows an example of a data frame exchanged between the base station 100 and the terminals 1 to 3. Using the data frame structure, the base station 100 detects a change in the data rate caused by link adaptation. In the frame of FIG. 7, there are provided a preamble (PLCP preamble) field, a PLCP header (PLCP Header) field, and a data (DATA) field. Of these, the preamble and PLCP header are always transmitted at a constant data rate, regardless of link adaptation. Therefore, a field whose data rate, modulation method, and coding rate are changed by link adaptation is only the data field following a PLCP header.

First, the base station 100 receives the PLCP header at a constant data rate. Then, the base station 100 decodes information in the RATE field in the header, thereby decoding the data rate, modulation method, and coding rate in the data part following the PLCP header. If the result of the identification has shown that the data rate has been changed, the base station 100 produces a trigger for polling recalculation and changes the modulation method. It is desirable that the timing with which the modulation method is changed should be synchronized with the SERVICE field immediately before the data field. In addition, terminals 1 to 3 can also detect a change in the data rate by using the data frame structure of FIG. 7.

As described above, in the first embodiment, the QoS manager 107 is provided in the base station 100 in the radio communication system where a plurality of terminals 1 to n exchange information with one another via the common base station 100 and wireless channel. When the link adaptation controller 105 has detected a change in the data rate, this is notified to the QoS manager 107. Then, being triggered by the change of the data rate by link adaptation, the QoS manager 107 schedules or reschedules the assignment of bands to individual terminals 1 to n.

By doing this, bands can be assigned to individual terminals accurately and dynamically according to a change in the radio communication state. From this, it is possible to cause the QoS process and the link adaptation process to compromise with each other effectively, which enables the usability of radio bands among a plurality of terminals to be improved.

Second Embodiment

Figure 8:
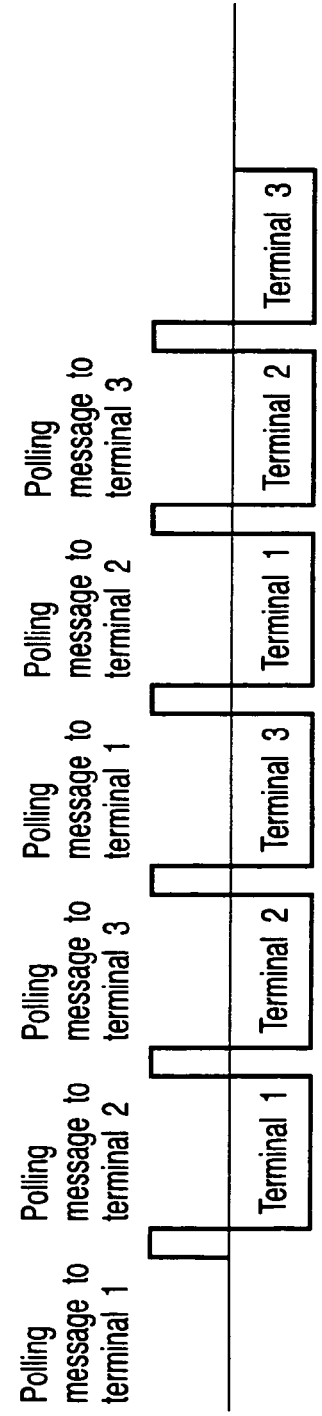
FIG. 8 shows an example of the initial state of the procedure for transmitting and receiving data between the base station 100 and terminals 1 to n.

FIG. 8 shows an example of the initial state of the procedure for transmitting and receiving data between the base station 100 and terminals 1 to n. As shown in FIG. 8, terminals 1 to 3 are polled by the base station 100 at regular intervals. In FIG. 8, suppose the quality of transmission and reception data at each terminal fulfils the QoS parameters (shown in FIG. 5). In this state, if the quality of the wireless channel between terminal 2 and the base station 100 deteriorates, the data rate between terminal 2 and the base station 100 is reduced, for example, by half as a result of link adaptation. Then, normally, the process of fulfilling the minimum data rate in the QoS parameters is carried out, which expands the polling interval so as to double the period in which transmission is assigned to terminal 2 (see FIG. 9).

Figure 9:
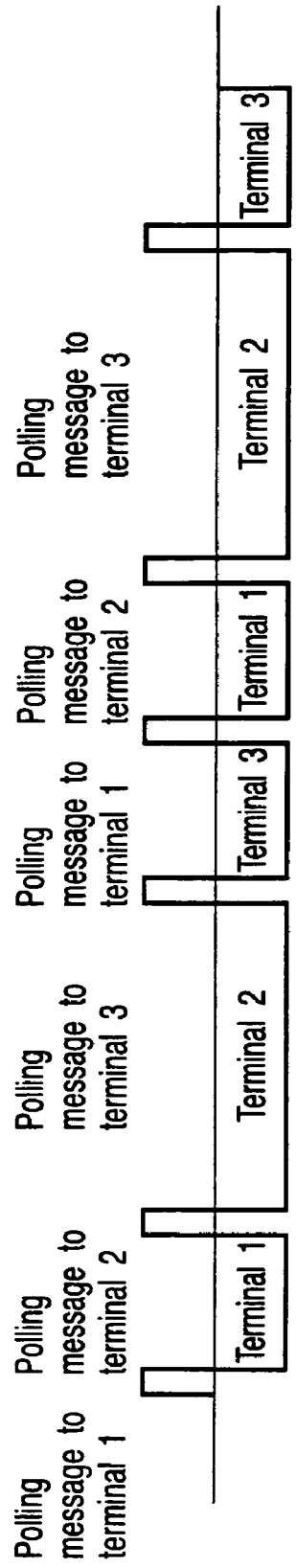
FIG. 9 is a diagram showing a state where the transmission assign period for terminal 2 is expanded from the state of FIG. 8.

FIG. 9 is a diagram showing a state where the transmission assign period for terminal 2 is expanded from the state of FIG. 8. In this state, the transmission assign period for each of terminal 1 and terminal 3 is shortened. As a result, the minimum service interval, one of the QoS parameters for each of the terminal 1 and terminal 3, cannot be met and therefore the polling of terminal 1 and terminal 3 might be stopped. In a second embodiment of the present invention, to avoid this problem, the polling of terminal 1 and 3 is prevented from being stopped and the polling of terminal 2 is stopped, thereby continuing the data transmission of terminal 1 and 3.

Figure 10:
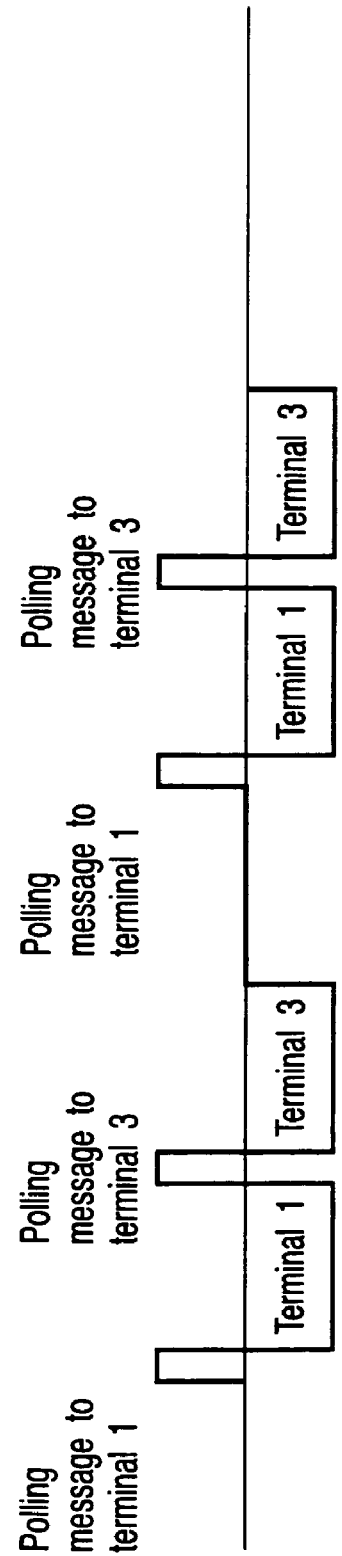
FIG. 10 shows a state where the polling of terminal 2 is stopped in the state of FIG. 9.

FIG. 10 shows a state where the polling of terminal 2 is stopped in the state of FIG. 9. As described above, in the second embodiment, the communication of a terminal which cannot fulfill the QoS parameters due to a change in the channel situation is not cut off blindly. In the second embodiment, a decreased communication band is managed adaptively. As a result, it is possible to reduce the number of terminals cut off and increase the number of terminals capable of guaranteeing QoS. Specifically, in the second embodiment, when the number of usable radio bands decreases as a result of link adaptation, the bands are managed so as to increase the number of terminals capable of guaranteeing QoS. This makes it possible to enhance the quality of service to users, while minimizing the number of terminals cut off.

Third Embodiment

Suppose the quality of the wireless channel between terminal 2 and the base station 100 has deteriorated in the state of FIG. 8 and the transmission assign period for terminal 2 is doubled as shown in FIG. 9. However, if the QoS minimum data rate cannot be met even after the transmission period is doubled, the polling of terminal 2 is forced to stop in a third embodiment of the present invention.

In conventional techniques, only when a new wireless terminal which is to start data transmission occurs, it is determined on the basis of the QoS parameters whether data transmission is possible. In addition, in the third embodiment, referring to information on link adaptation, a wireless channel which comes unable to guarantee QoS is cut off even during communication. By doing this, the number of terminals capable of guaranteeing QoS can be increased. Consequently, the quality of service to users can be improved, while decreasing the channel cutoff rate.

Fourth Embodiment

Figure 11:
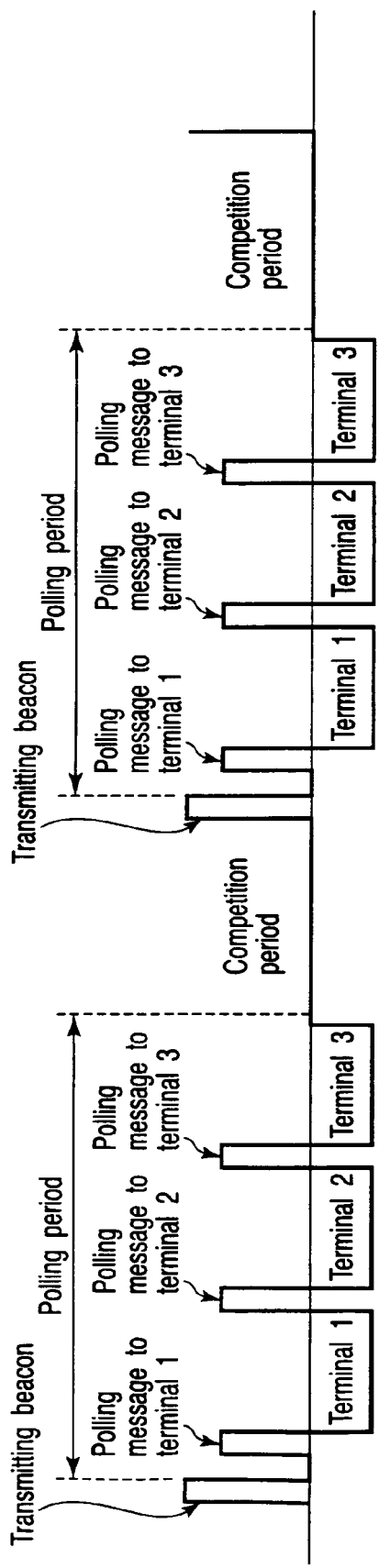
FIG. 11 shows another example of the initial state of the procedure for transmitting and receiving data between the base station 100 and terminals 1 to n in the system of FIG. 1.

FIG. 11 shows another example of the initial state of the procedure for transmitting and receiving data between the base station 100 and terminals 1 to n in the system of FIG. 1. In FIG. 11, suppose the base station 100 transmits beacons periodically, thereby periodically broadcasting information necessary for communication to all of the terminals. The interval between a beacon and a beacon is divided into a polling period and a contention period. The base station 100 polls the terminals periodically in the polling period and gives transmission rights to terminal 1 to 3 in sequence. In the contention period, terminals 1 to 3 access the base station 100 at random, thereby acquiring their transmission rights.

In this state, if the quality of the wireless channel between terminal 2 and the base station 100 deteriorates, the data rate between terminal 2 and the base station 100 is reduced, for example, by half as a result of link adaptation. Then, normally, the process of fulfilling the minimum data rate in the QoS parameters is carried out, which expands the polling interval so as to double the transmission assign period for terminal 2.

In this state, the transmission assign period for each of terminal 1 and terminal 3 is shortened and therefore the polling of terminal 1 and terminal 3 might be stopped. In a fourth embodiment of the present invention, to avoid this problem, the polling of terminal 2 is stopped and the data transmission of terminal 1 and 3 is continued. As described above, the present invention can be applied to the communication procedure involving beacon transmission, which makes it possible to increase the number of terminals capable of guaranteeing QoS and reduce the channel cutoff rate and therefore improve the quality of service to users.

Fifth Embodiment

Suppose the polling interval has been expanded to double the transmission assign period for terminal 2 in the fourth embodiment. In this situation, there may be a case where the polling of all of wireless terminals 1 to 3 cannot be completed during the polling period.

In a fifth embodiment of the present invention, to avoid this problem, the state of band assignment to terminals 1 to 3 is updated in descending order of priority, referring to the user priority of the QoS parameter of the transmission data at each terminal (see FIG. 5). User priority is set in this order: terminal 1, terminal 2, terminal 3. If the user priority of terminal 3 is the lowest, for example, a band assigned state as shown in FIG. 12 is realized.

Figure 12:
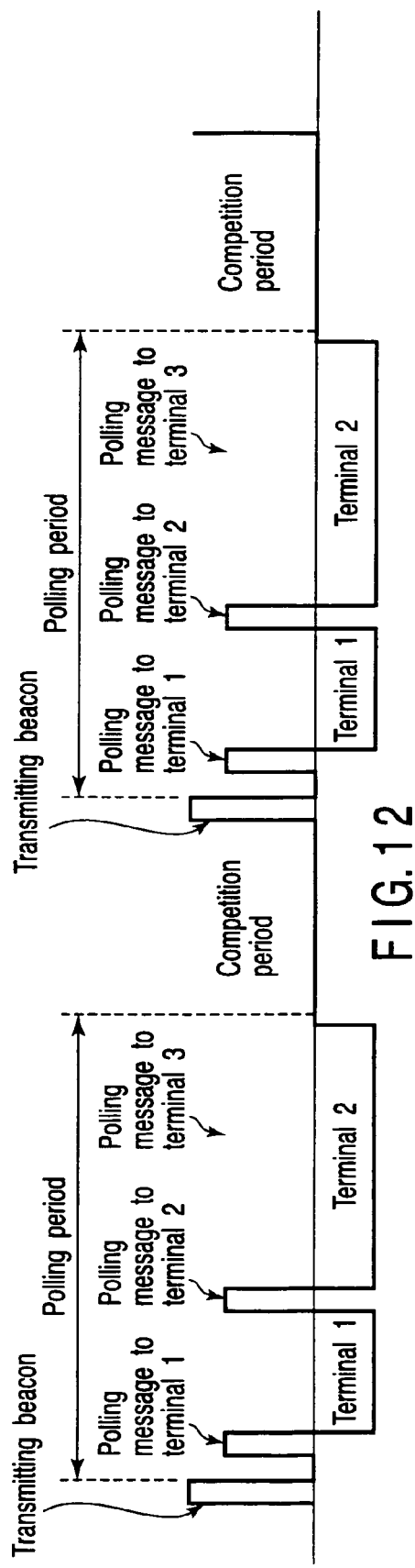
FIG. 12 shows a state where the band assignment between the base station 100 and terminals 1 to n is updated in the state of FIG. 11.

FIG. 12 shows a state where the band assignment between the base station 100 and terminals 1 to n is updated in the state of FIG. 11. In FIG. 12, radio bands are assigned to terminal 1 and terminal 2, whereas terminal 3 is excluded. In the fifth embodiment, when the number of usable radio bands is decreased as a result of link adaptation, the radio band assigned state is updated on the basis of user priority. This makes it possible to increase the number of terminals capable of guaranteeing QoS and reduce the cutoff rate, which enables the quality of service to users to be improved.

Sixth Embodiment

Suppose the quality of the wireless channel between terminal 2 and the base station 100 has deteriorated in the state of FIG. 8 and the transmission assign period for terminal 2 is doubled as shown in FIG. 9. Even if this enables the minimum data rate of Qo2 for terminal 2 to be met, the polling interval for terminals 1 to 3 becomes longer. As a result, the polling interval might be longer than the delay bound specified in the QoS parameters. In this case, the polling of terminal 2 is forced to stop in a sixth embodiment of the present invention.

As described above, referring to information about link adaptation, a wireless channel which becomes unable to guarantee QoS is cut off even during communication, which enables the usability of the radio bands to be improved without using radio bands wastefully. Accordingly, it is possible to increase the number of terminals capable of guaranteeing QoS and reduce the channel cutoff rate, which enables the quality of service to users to be improved.

Seventh Embodiment

In the functional block diagram of the base station 100 of FIG. 3, when a new band assignment request is received from any one of the terminals, this is notified to an upper layer entity via an inner path 106. When determining that the message from the terminal is a band request, the upper layer entity asks the band manager 108 whether a new band can be assigned to the terminal.

The band manager 108 acquires the necessary information from the QoS manager 107 and totalizes the radio bands for terminals 1 to 3 at present. In addition, taking into account the total of the radio bands and the new band request, the band manager 108 calculates whether it is possible to fulfill QoS for all of terminals 1 to 3 after a band is newly assigned. At that time, the best data rate by link adaptation is unknown.

In a seventh embodiment of the present invention, to avoid this problem, a predetermined data rate is used as a default value in calculating a band assigned to the new terminal. As described above, in the seventh embodiment, referring to information about link adaptation, a usable radio band is calculated and it is determined whether to assign the band to the new data. Such a process is known as admission control. By this control, radio bands can be managed more accurately, which enables the usability of radio bands to be improved.

Eighth Embodiment

In the seventh embodiment, when a band to be assigned to a new terminal is calculated, the default value of the data rate is used. In an eighth embodiment of the present invention, the average value of the data rate of a terminal already in communication is used in calculating a band assigned to a new terminal. Even this approach makes it possible to manage radio bands more accurately, which enables the usability of the radio bands to be improved.

Ninth Embodiment

Suppose the quality of the wireless channel between terminal 2 and the base station 100 has deteriorated in the state of FIG. 8 and the period of transmission assignment to terminal 2 is doubled as shown in FIG. 9. Suppose the inactivity interval and the minimum data rate have been specified in the QoS parameters (see FIG. 5) in data 1 of terminal 2. It is assumed that, if the band assigned state is updated in this state as shown in FIG. 9, the QoS of each terminal is not fulfilled.

In this case, since the inactivity interval has been specified in the QoS parameters of terminal 2, data transmission to terminal 2 can be stopped in the period until that time has elapsed. Taking this into account, the transmission of the data to terminal 2 is stopped until the inactivity interval has elapsed in a ninth embodiment of the present invention. Then, when data transmission to terminal 2 can be performed, with QoS being satisfied, because the data rate between terminal 2 and the base station 100 becomes faster or the data rate of another terminal becomes faster, the data transmission is resumed. When data transmission stop period for terminal 2 gets longer than the inactivity interval specified in the QoS parameters, the assignment of a radio band to terminal 2 is opened.

By doing this, link adaptation information, such as the inactivity interval, is used effectively. In addition, the communication which becomes unable to guarantee QoS through a wireless channel is cut off, thereby preventing the radio bands from being used wastefully. Consequently, the usability of the radio bands can be improved.

Tenth Embodiment

It is assumed that, when terminals 1 to 3 are transmitting the data polled at the base station 100, the communication environment becomes capable of allowing the data rate of terminal 2 to be made faster. At this time, the data rate of terminal 2 is made faster by link adaptation and the time assigned to terminal 2 is made shorter, which enables a blank radio band to be created.

However, in a tenth embodiment of the present invention, when QoS for all of the terminals has been met at present, the data rate of terminal 2 is kept unchanged, regardless of a change in the communication environment. This makes it possible to cope quickly with a case where the wireless condition between terminal 2 and the base station 100 will deteriorate in the future. That is, in the tenth embodiment, since the communication is continued at the lowest data rate fulfilling QoS, a robust communication environment less liable to be affected by a change in the quality of radio communication can be realized.

To sum up, according to the present invention, the QoS manager 107 performs QoS management. The link adaptation controller 105 carries out a link adaptation process. For any terminal to start to communicate with the base station 100, the QoS manager 107 determines whether data can be transmitted, on the basis of the QoS parameters. Furthermore, even when the data rate has changed as a result of link adaptation during communication, the QoS manager 107 updates the occupied band assigned state by QoS control. That is, in the present invention, communication band assignment scheduling is effected according to QoS not only when data communication is started but also when the data rate is changed as a result of link adaptation.

Consequently, when the data rate of a wireless channel has changed, this is not left as it is. QoS management is performed exactly according to a change in the data rate. This makes it possible to make the QoS process and the link adaptation process coexist effectively. Therefore, the usability of radio bands between a plurality of wireless terminals can be improved further.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system in which a plurality of wireless terminals form wireless channels separately between a common base station unit and the wireless terminals and communicate with the base station unit, the radio communications system comprising:
    a quality managing unit configured to manage the communication quality of the wireless channel for each of said plurality of wireless terminals by calculating a polling schedule for each of said plurality of wireless terminals on the basis of a predetermined parameter to assign an occupied band of the wireless channel for each of said plurality of wireless terminals;
    a channel securing unit configured to secure continuously a wireless channel for at least one wireless terminal by controlling the data rate of the wireless channel for each of said plurality of wireless terminals according to a change in the channel state between wireless sections; and
    a rate change detecting unit configured to detect a change in the data rate of at least one wireless channel, wherein
    when the change in the data rate is detected by the rate change detecting unit, the quality managing unit recalculates the polling schedule for each of said plurality of wireless terminals to update the occupied band assigned state of the wireless channel for each of said plurality of wireless terminals.

2. The radio communication system according to claim 1, wherein the quality managing section manages the communication quality of the wireless channel for each of said plurality of wireless terminals on the basis of the minimum data rate and, if a wireless channel whose data rate is lower than the minimum data rate occurs when the change in the data rate is detected, disconnects the wireless channel.

3. The radio communication system according to claim 2, wherein the quality managing section reconnects the wireless channel if the data rate of the wireless channel disconnected can be restored to a value equal to or higher than the minimum data rate when the change in the data rate is detected after the disconnection of the wireless channel.

4. The radio communication system according to claim 3, wherein the quality managing section manages the communication quality of each of the wireless channels on the basis of the minimum data rate and the communication disconnect time and, if the disconnect period of the wireless channel has not exceeded the communication disconnect time, reconnects the wireless channel.

5. The radio communication system according to claim 1, wherein the channel securing section controls the data rate of the wireless channel for each of said plurality of wireless terminals if the communication quality has dropped below an allowed value based on the parameter due to a change in the channel state.

6. The radio communication system according to claim 1, wherein the quality managing section manages the communication quality of each of the wireless channels by assigning the length of a communication time slot to each of said plurality of wireless terminals and, when the change in the data rate is detected, updates the communication time slot length assigned state for each of said plurality of wireless terminals, and
    the channel securing section, if the communication quality of another wireless channel gets stringent when a wireless channel whose communication time slot length is to be increased occurs, disconnects the wireless channel whose communication time slot length is to be increased.

7. The radio communication system according to claim 6, wherein the channel securing section, if the number of wireless channels whose communication quality gets stringent has exceeded a specified value, disconnects the wireless channel whose communication time slot length is to be increased.

8. The radio communication system according to claim 6, wherein the quality managing section assigns the length of the communication time slot to each of said plurality of wireless terminals according to the priority allocated beforehand to each of said plurality of wireless terminals, and
    the channel securing section, if the communication quality of another wireless channel gets stringent when a wireless channel whose communication time slot length is to be increased occurs, disconnects the wireless channels sequentially, starting at the wireless terminal whose priority is the lowest.

9. The radio communication system according to claim 1, wherein
    the base station unit communicates with said plurality of wireless terminals during a time divided into a polling period and a contention period,
    the base station unit polls said plurality of wireless terminals in said polling period and gives transmission rights to the terminals in sequence,
    one of said plurality of wireless terminals indicated by the poll being allowed to transmit data during the polling period, and
    said plurality of wireless terminals access the base station at random in said contention period to acquire their transmission rights.

10. A base station unit which is used in a radio communication system including a plurality of wireless terminals and which forms wireless channels separately between said plurality of wireless terminals and the base station unit and communicates with the wireless terminals, the base station unit comprising:
- a quality managing unit configured to manage the communication quality of the wireless channel for each of said plurality of wireless terminals by calculating a polling schedule for each of said plurality of wireless terminals on the basis of a predetermined parameter to assign an occupied band of the wireless channel for each of said plurality of wireless terminals;
- a channel securing unit configured to secure continuously a wireless channel for at least one wireless terminal by controlling the data rate of the wireless channel for each of said plurality of wireless terminals according to a change in the channel state between wireless sections; and
- a rate change detecting unit configured to detect a change in the data rate of at least one wireless channel, wherein
- when the change in the data rate is detected by the rate change detecting unit, the quality managing unit recalculates the polling schedule for each of said plurality of wireless terminals to update the occupied band assigned state of the wireless channel for each of said plurality of wireless terminals.

11. The base station unit according to claim 10, wherein the quality managing section manages the communication quality of the wireless channel for each of said plurality of wireless terminals on the basis of the minimum data rate occurs and, if a wireless channel whose data rate is lower than the minimum data rate when the change in the data rate is detected, disconnects the wireless channel.

12. The base station unit according to claim 11, wherein the quality managing section reconnects the wireless channel if the data rate of the wireless channel disconnected can be restored to a value equal to or higher than the minimum data rate when the change in the data rate is detected after the disconnection of the wireless channel.

13. The base station unit according to claim 12, wherein the quality managing section manages the communication quality of each of the wireless channels on the basis of the minimum data rate and the communication disconnect time and, if the disconnect period of the wireless channel has not exceeded the communication disconnect time, reconnects the wireless channel.

14. The base station unit according to claim 10, wherein the channel securing section control the data rate of the wireless channel for each of said plurality of wireless terminals if the communication quality has dropped below an allowed value based on the parameter due to a change in the channel state.

15. The base station unit according to claim 10, wherein the quality managing section manages the communication quality of each of the wireless channels by assigning the length of a communication time slot to each of said plurality of wireless terminals and, when the change in the data rate is detected, updates the communication time slot length assigned state for each of said plurality of wireless terminals, and
- the channel securing section, if the communication quality of another wireless channel gets stringent when a wireless channel whose communication time slot length is to be increased occurs, disconnects the wireless channel whose communication time slot length is to be increased.

16. The base station unit according to claim 15, wherein the channel securing section, if the number of wireless channels whose communication quality gets stringent has exceeded a specified value, disconnects the wireless channel whose communication time slot length is to be increased.

17. The base station unit according to claim 15, wherein the quality managing section assigns the length of the communication time slot to each of said plurality of wireless terminals according to the priority allocated beforehand to each of said plurality of wireless terminals, and
- the channel securing section, if the communication quality of another wireless channel gets stringent when a wireless channel whose communication time slot length is to be increased occurs, disconnects the wireless channels sequentially, starting at the wireless terminal whose priority is the lowest.

18. The base station unit according to claim 10, wherein
- the base station unit communicates with said plurality of wireless terminals during a time divided into a polling period and a contention period,
- the base station unit polls said plurality of wireless terminals in said polling period and gives transmission rights to the terminals in sequence,
- one of said plurality of wireless terminals indicated by the poll being allowed to transmit data during the polling, period, and
- said plurality of wireless terminals access the base station at random in said contention period to acquire their transmission rights.

* * * * *